(12) United States Patent
Gupta et al.

(10) Patent No.: US 11,720,568 B2
(45) Date of Patent: Aug. 8, 2023

(54) REDUCED BANDWIDTH QUERIES IN B E-TREES USING APPROXIMATE MEMBERSHIP QUERY DATA STRUCTURES

(71) Applicant: VMware, Inc., Palo Alto, CA (US)

(72) Inventors: Abhishek Gupta, Sunnyvale, CA (US); Rob T. Johnson, Palo Alto, CA (US); Srinath Premachandran, Fremont, CA (US); Richard P. Spillane, Mountain View, CA (US); Sandeep Rangaswamy, Mountain View, CA (US); Jorge Guerra Delgado, Fremont, CA (US); Kapil Chowksey, Cupertino, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 556 days.

(21) Appl. No.: 15/927,016

(22) Filed: Mar. 20, 2018

(65) Prior Publication Data
US 2019/0294716 A1    Sep. 26, 2019

(51) Int. Cl.
*G06F 16/17*    (2019.01)
*G06F 16/2455*  (2019.01)
*G06F 16/22*    (2019.01)
*G06F 16/2453*  (2019.01)

(52) U.S. Cl.
CPC ........ *G06F 16/24553* (2019.01); *G06F 16/17* (2019.01); *G06F 16/2246* (2019.01); *G06F 16/24534* (2019.01)

(58) Field of Classification Search
None
See application file for complete search history.

(56) References Cited

U.S. PATENT DOCUMENTS

| | | | |
|---|---|---|---|
| 7,363,284 B1 | 4/2008 | Plasek et al. | |
| 7,697,518 B1 | 4/2010 | de Wit | |
| 8,185,551 B2 * | 5/2012 | Kuszmaul | G06F 11/1471 707/790 |
| 8,612,402 B1 | 12/2013 | Givargis | |
| 10,169,387 B1 * | 1/2019 | Zhao | G06F 16/2365 |

(Continued)

OTHER PUBLICATIONS

Bender et al., "An Introduction to 1ß-trees and Write Optimization," The Usenix Magazine, vol. 40, No. 5; Oct. 2015; 8 pages.

(Continued)

*Primary Examiner* — Thu N Nguyen
(74) *Attorney, Agent, or Firm* — Dinsmore & Shohl LLP

(57) ABSTRACT

Exemplary methods, apparatuses, and systems include a file system process reading a first node in a tree data structure from a first memory. The first node includes a first approximate membership query data structure ("AMQ"), a first plurality of child pointers, a first plurality of pivot values, and a first buffer. The file system process determines that the first plurality of child pointers exceeds a maximum size. Using a pivot value in the first plurality of pivot values, the file system process splits the first node into a second node and a third node. The file system process uses the pivot value to split the first buffer into a second buffer and a third buffer. Using the pivot value and the first AMQ, the file system process generates a second AMQ and a third AMQ.

20 Claims, 12 Drawing Sheets

(56) References Cited

U.S. PATENT DOCUMENTS

| | | | |
|---|---|---|---|
| 10,642,994 B1* | 5/2020 | Allen | H04L 9/0861 |
| 2006/0004758 A1 | 1/2006 | Teng et al. | |
| 2007/0106643 A1* | 5/2007 | Croft | G06F 16/283 |
| 2007/0233720 A1 | 10/2007 | Bae et al. | |
| 2008/0307181 A1 | 12/2008 | Kuszmaul et al. | |
| 2009/0232403 A1 | 9/2009 | Waragai et al. | |
| 2010/0268904 A1 | 10/2010 | Sheffield et al. | |
| 2010/0281013 A1* | 11/2010 | Graefe | G06F 16/2246 707/715 |
| 2012/0039174 A1 | 2/2012 | Robin et al. | |
| 2012/0079174 A1 | 3/2012 | Nellans et al. | |
| 2012/0210095 A1 | 8/2012 | Nellans et al. | |
| 2012/0215752 A1 | 8/2012 | Parkinen et al. | |
| 2013/0204902 A1 | 8/2013 | Wang et al. | |
| 2016/0034356 A1* | 2/2016 | Aron | G06F 11/1435 707/649 |
| 2017/0091245 A1 | 3/2017 | Fang et al. | |
| 2018/0004786 A1* | 1/2018 | Danilov | G06F 16/2329 |
| 2019/0079960 A1 | 3/2019 | Cao et al. | |
| 2019/0095457 A1* | 3/2019 | Gupta | G06F 16/185 |
| 2019/0236071 A1* | 8/2019 | Pishe | G06F 16/2255 |

OTHER PUBLICATIONS

Castro-Karney, Bruno, "A Crash-Safe Key-Value Store Using Chained Copy-on-Write Btrees," University of Washington; Jun. 2018; 10 pages.

Brodal et al., "Lower bounds for external memory dictionaries," in Proceedings of the 14th Annual ACM-SIAM Symposium on Discrete Algorithms (SODA), pp. 546-554; Year 2003; 13 pages.

Arge, "The Buffer Tree: A New Technique for Optimal I/0 Algorithms," BRICS, Aug. 1996, 37 pages.

Brodal et al., "Lower Bounds for External Memory Dictionaries," Proceedings of the 14th Annual ACM-SIAM Symposium on Discrete Algorithms (SODA), 2003, pp. 546-554, 13 pages.

Kuboyanna, "Matching and Learning in Trees, Department of Advanced Interdisciplinary Studies," Doctoral Dissertation, Graduate School of Engineering, University of Tokyo, 2007, 177 pages.

Sadoghi et al., "BE-Tree: An Index Structure to Efficiently Match Boolean Expressions over High-dimensional Discrete Space," SIGMOD, Jun. 12-16, 2011, 12 pages.

* cited by examiner

REDUCED BANDWIDTH QUERIES IN B E-TREES USING APPROXIMATE MEMBERSHIP QUERY DATA STRUCTURES

CROSS REFERENCE TO RELATED APPLICATION

This application is related to commonly owned U.S. application Ser. No. 15/717,613 filed on Sep. 27, 2017, entitled "Write-optimized Nested Trees," the content of which is incorporated herein by reference in its entirety for all purposes.

FIELD OF THE INVENTION

The various embodiments described in this document relate to utilizing $B^\varepsilon$-tree data structures. In particular, embodiments relate to reducing the amount of memory bandwidth required to query a $B^\varepsilon$-tree data structure.

BACKGROUND OF THE INVENTION

File systems are often kept in tree data structures. For example, one design may use a $B^\varepsilon$-tree data structure ("$B^\varepsilon$-tree") to store a file system. In addition to child node pointers and pivot values, $B^\varepsilon$-trees maintain a buffer of message inserts targeted at the subtree rooted at each non-leaf node. As this buffer increases in size, proportionally more memory and disk bandwidth is required to bring the buffer into working memory to determine whether a particular key/value pair is resident in the buffer at the current node. This increase in required bandwidth has a corresponding impact on the performance of querying the $B^\varepsilon$-tree.

A $B^\varepsilon$-tree is an example of a write-optimized data structure that can be used to organize on-disk storage and is suitable in applications such as databases and file systems. The database or file system can comprise a key-value store that allows users to store and retrieve data in the form of key-value pairs. The "key" in a key-value pair can be an index (e.g., number, string, etc.) that uniquely identifies its paired "value." The value in a key-value pair can be any type of data object or collection of data objects. A $B^\varepsilon$-tree can provide a key-value application programming interface (API) to provide insert, range query, and key-value update operations on the key-value store. Each non-leaf node can include a buffer of inserts pending at the subtree rooted at that node.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

This document describes embodiments that include a file system process reading a first node in a $B^\varepsilon$-tree data structure that includes an approximate membership query data structure ("AMQ"), a plurality of child nodes, and a plurality of pivot values. $B^\varepsilon$-trees are further defined in related application "Write-optimized Nested Trees," incorporated by reference above. The AMQ approximates the membership of a buffer that contains key/value insert messages to a subtree rooted at the first node. The file system process queries the AMQ to determine whether a first key/value pair is present in the buffer. If the file system process receives a negative response from the query, the process selects the next node to examine using the plurality of pivot values and loads the AMQ, pivot values, and child pointers for the next node and continues in the next node. Otherwise, the file system process loads the buffer and confirms the presence of the queried key/value pair in the buffer and returns the value.

Also described are embodiments that include a file system process inserting key/value pairs into a first tree and, in response to a request for a range of key/value pairs, generating a second tree including a sorted and update set of key/value pairs from the first tree.

Also described are embodiments that include a file system process determining to flush a node in a tree when the buffer reaches a flush threshold. The buffer is loaded in an input/output operation concurrently reading from non-contiguous areas in a memory where the buffer is stored.

Also described are embodiments that include a file system process obtaining locks on nodes in a tree and proactively splitting or merging a locked node in response to determining that a number of child nodes of the locked node is within a first or second range.

Figure 1:
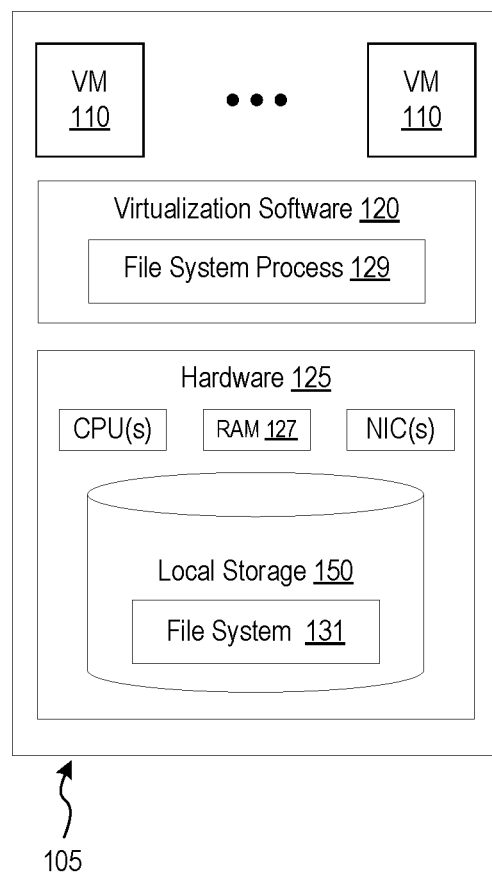
FIG. 1 illustrates, in block diagram form, a computing device maintaining a file system using $B^\varepsilon$-trees.

FIG. 1 illustrates, in block diagram form, a computing device 105 that maintains file system 131 using $B^\varepsilon$-trees according to embodiments set forth in this document. In one embodiment, one or more virtual machines (VMs) 110 implement a virtualized computer, that can provide computing services such as a network server, remote productivity desktop or a networking, storage, or security service (e.g., a firewall, webserver, database server, etc.). In one embodiment, file system process 129 runs in or is a part of virtualization software 120. In another embodiment, file system process 129 may run within one or more of VMs 110.

Hardware 125 includes one or more processors ("CPU(s)"), data storage and memory (e.g., "RAM 127"), and network interface controllers ("NIC(s)"). The data storage and memory may be used for storing data, metadata, and programs for execution by the processor(s). While illustrated as RAM, the data storage and memory may include one or more of volatile and non-volatile memories, such as Random Access Memory ("RAM"), Read Only Memory ("ROM"), a solid-state drive ("SSD"), Flash, Phase Change Memory ("PCM"), NVMe drive, or other types of data storage, such as magnetic disk drives, optical disk drives, etc. The memory may be internal or distributed memory. One or more buses may interconnect the various components of hardware 125.

Virtualization software layer 120 runs on hardware 125. Virtualization software layer 120 manages VMs 110 and physical resources, such as hardware 125. Additionally, virtualization software layer 120 maintains virtual-to-physical hardware mappings. For example, virtualization software 120 may manage VM access to a processor, memory, or a network interface within hardware 125. Additionally, virtualization software 120 may manage access to virtual disks (or portions thereof) and other related files within local storage 150 that may be accessed by VMs 110, such as file system 131.

Local storage 150 housed in or otherwise directly attached to computing device 105 may include combinations of solid-state drives (SSDs) and/or magnetic or spinning disks (MDs). As used in this document, the term "housed" or "housed in" may be used to encompass both housed in or otherwise directly attached storage. In certain embodiments, SSDs serve as a read cache and/or write buffer in front of magnetic disks to increase I/O performance. The $B^\varepsilon$-tree, child pointers, pivot values, AMQs, and buffers may be stored on some combination of local storage 150 (e.g., as part of file system 131) and working storage (e.g., RAM 127 in hardware 125). VMs 110 or virtualization software 120 may manage the file system process 129 and utilize the $B^\varepsilon$-tree to store and retrieve file system data (e.g., file system 131), including file system metadata.

Figure 2:
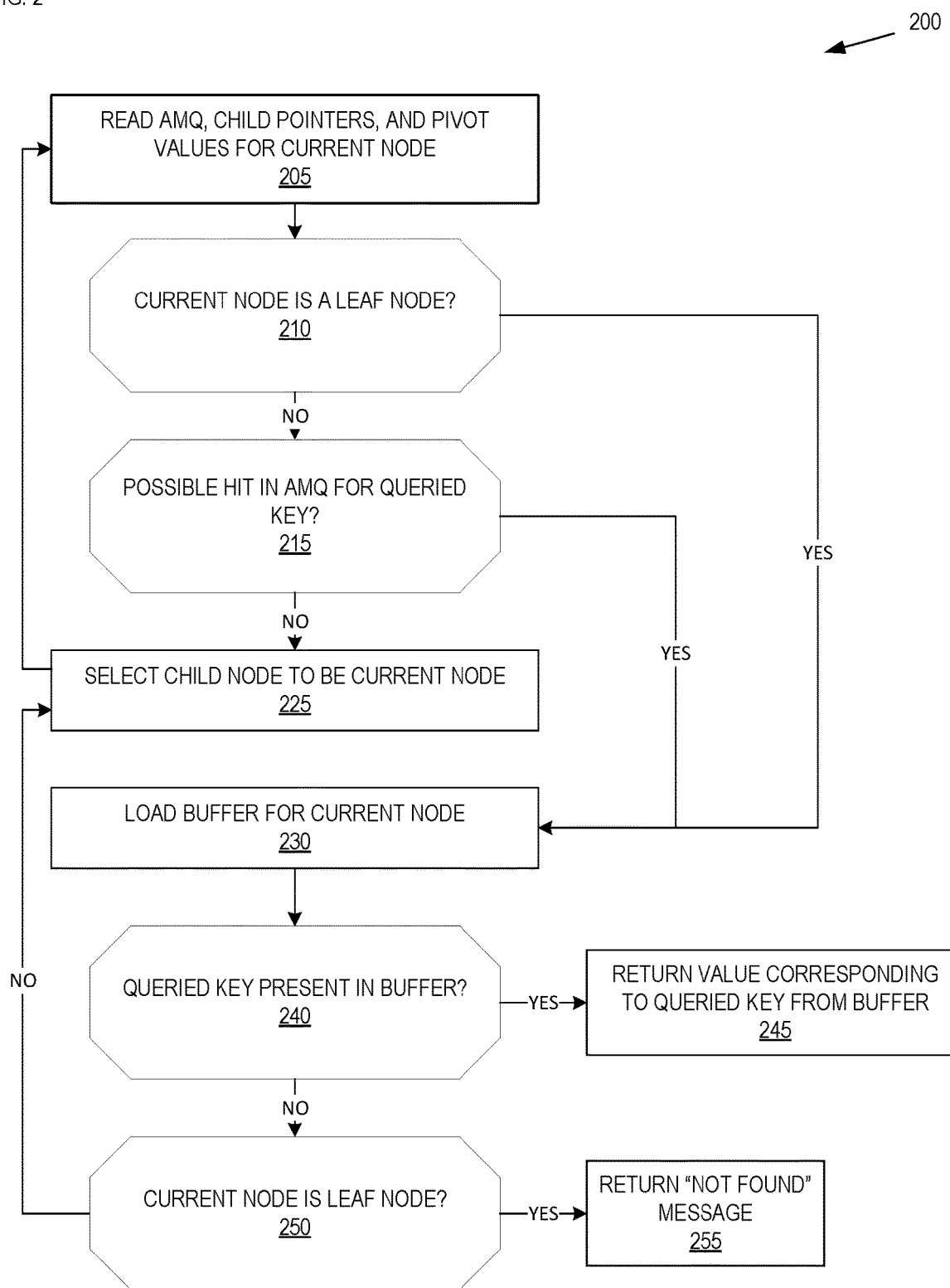
FIG. 2 is a flow chart illustrating an exemplary method of querying a $B^\varepsilon$-tree using AMQs.

FIG. 2 is a flow chart illustrating an exemplary method of querying a $B^\varepsilon$-tree using approximate membership query data structures ("AMQs"). The AMQ may be a Bloom filter, quotient filter, cuckoo filter, or other type of data structure that efficiently approximates membership of a larger data structure such as the buffer. In one embodiment, the data structure used for the AMQ will guarantee not returning false negatives, i.e. testing or querying the AMQ to determine whether a key value exists in the AMQ (and therefore the buffer) will not result in a negative response if the key value is present in the buffer. Querying the AMQ may result in a positive result when the key value is not present in the buffer.

At block 205, file system process 129 reads the AMQ(s), child pointers, and pivot values for the node in the $B^\varepsilon$-tree currently being queried for a particular key/value pair that may reside in the current node. For example, file system process 129 may read the AMQs, child pointers, and pivot values in response to a query for a key/value pair. The node and its buffer may currently be in local storage 150 (e.g., in file system 131) and, in one embodiment, the file system process copies the AMQ, pivot values, and child pointers into RAM 127 but does not copy the buffer into RAM 127.

At block 210, file system process 129 tests whether the current node is a leaf node. If the current node is a leaf node, file system process 129 transitions to block 230. In one embodiment, each node has a bit indicating whether the node is a leaf node or a non-leaf node. Otherwise, file system process 129 transitions to block 215 and tests the AMQ of the current node for the queried key. If testing the AMQ produces a positive result, file system process 129 transitions to block 230. Otherwise file system process 129 transitions to block 225. In one embodiment, leaf nodes do not include an AMQ.

At block 225, file system process 129 selects a child node using the pivot values and transitions back to block 205, at which point the file system process loads the AMQ, child pointers, and pivot values for the selected child node and continues looking for the key value.

At block 230, file system process 129 loads the buffer storing pending insertion messages for the subtree rooted at the current node. In one embodiment, the file system process loads the buffer from local storage 150 to RAM 127 over one or more input/output buses. The speed at which data can be read out of local storage 150 may be significantly slower than the speed at which data can be read out of RAM 127. In one embodiment, in which the current node is a non-leaf node, the file system process selects a child node for further search and loads the buffer, along with the child pointers, AMQ, and pivot values of the child node in the same input/output operation as loading the buffer. In this embodiment, if file system process determines at block 240 that the key is not in the buffer, the child node is already in working memory, e.g. RAM 127. As a result, file system 129 can bypass block 205.

At block 240, the file system process tests whether the queried key value is in the buffer. If the test produces a negative result, the key value is not present in the buffer and the file system process transitions to block 250 and determines whether the current node is a leaf node. If the current node is a leaf node, file system process 129 transitions to block 255 and returns a message indicating that the queried key value is not present in the tree. Otherwise, file system process 129 transitions to block 225 to select a child node to be the next node and continues the query. If the test produces a positive result at block 240, the key and its paired value are present in the buffer, and the file system process transitions to block 245.

At block 245, the file system process returns the value paired with the key value in the buffer. In one embodiment, the value is an integer. In another embodiment, the value is an operation performed on an integer. For example, an operation to increase the value by a specific number, an operation to decrease the value by a specific number, or a delete operation to be applied to an actual value in a key/value pair with a duplicate key. In one embodiment, the delete operation marks the key/value pair for subsequent deletion.

Figure 3A:
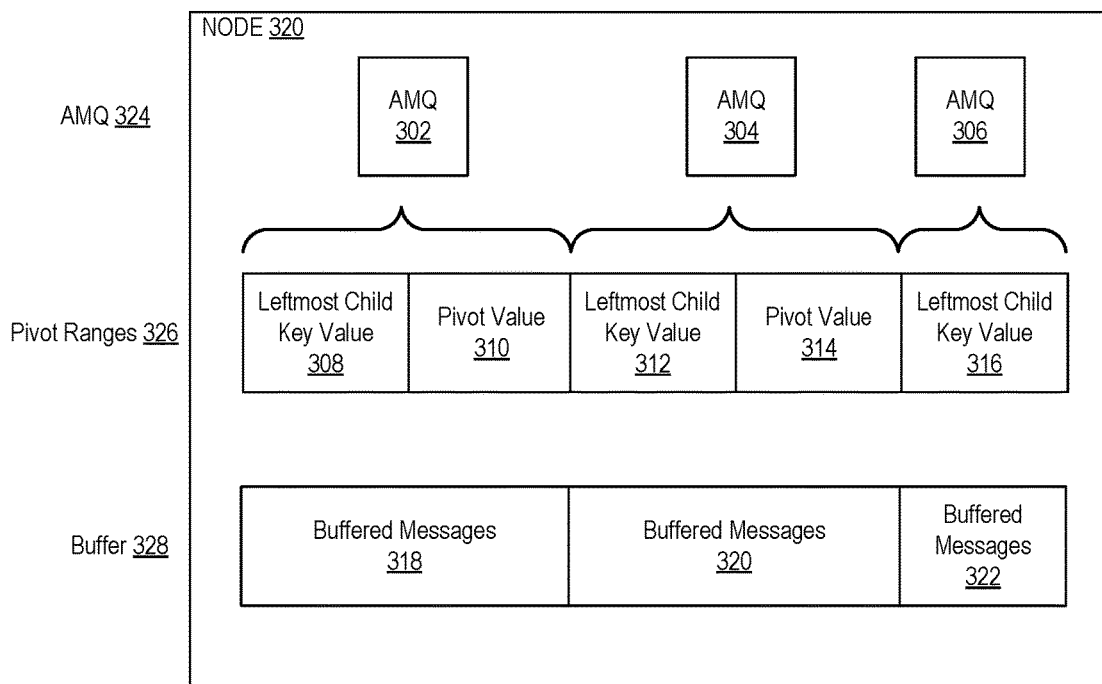
FIGS. 3A and 3B are diagrams illustrating a node in a $B^\varepsilon$-tree before and after splitting the node when using a AMQ per pivot range approach.
Figure 3B:
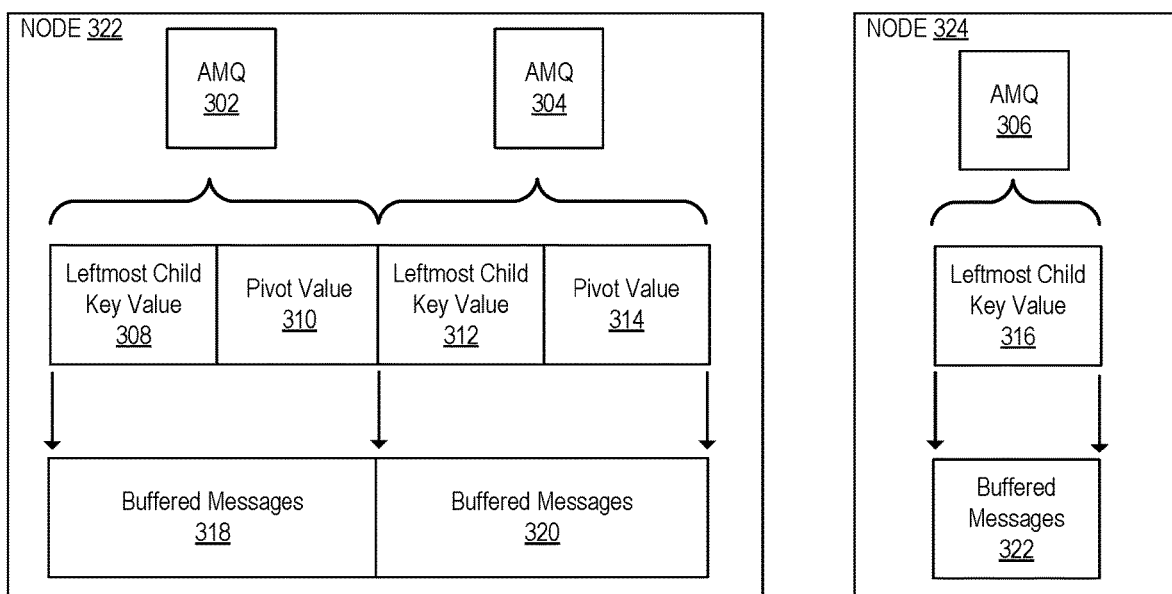

When new messages are inserted into a $B^\varepsilon$-tree, the AMQs are updated to preserve the invariant that an AMQ does not return a false negative response to a membership query. Techniques for splitting and merging nodes in $B^\varepsilon$-trees are described in the above-referenced "Write-optimized Nested Trees," and described below are techniques for splitting AMQs used in $B^\varepsilon$-trees to store messages. FIGS. 3A and 3B are diagrams illustrating a node in a $B^\varepsilon$-tree before and after splitting the node when using an AMQ per pivot range approach. To maintain the invariant that the AMQ will not return false negatives when queried for a key value, the file system process updates the AMQ(s) for a node when the node is split. In one embodiment, the file system process splits a non-leaf node when the number of children in the node exceeds a fan out threshold. In the embodiment illustrated in FIGS. 3A and 3B, the file system process maintains the invariant by representing AMQ 324 as one AMQ per pivot range 326 in node 320. The first pivot range runs from the leftmost child key value 308 to pivot value 310. Insertion messages 318 in buffer 328 for node 320 in the first pivot range are approximated in AMQ 302. Similarly, the second pivot range runs after pivot value 310 to pivot value 314 with buffer membership 320 approximated by AMQ 304, and the third pivot range runs from after pivot 314 with buffer membership 322 approximated by AMQ 306. In embodiments where the file system process uses one AMQ for each pivot range, the file system process maintains the AMQ invariant when splitting a node by copying the specific AMQs into new nodes that correspond to the portion of the insertion messages in the buffer that the new node buffer stores. The merger of nodes reverses the process. In an embodiment in which the file system process merges node 322 and node 324, the file system process adds AMQs 302, 304, and 306 to the resulting merged node 320. In one embodiment, a child pointer is a memory address of a child node data structure and a pivot value is a key value indicating the beginning or the end of a pivot range. A pivot range defines the set of key values used to identify a next child node to visit.

Figure 4A:
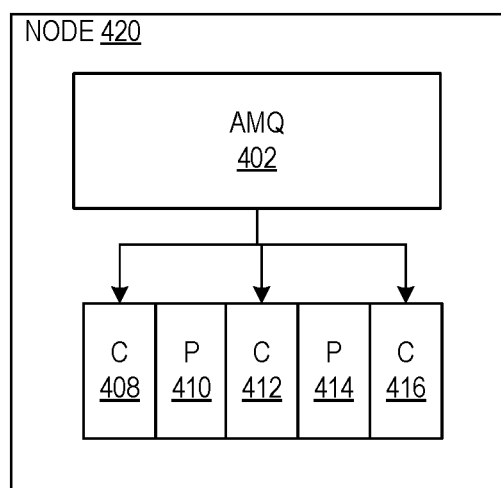
FIGS. 4A and 4B are diagrams illustrating a node in a $B^\varepsilon$-tree before and after splitting the node when using a copied AMQ approach.
Figure 4B:
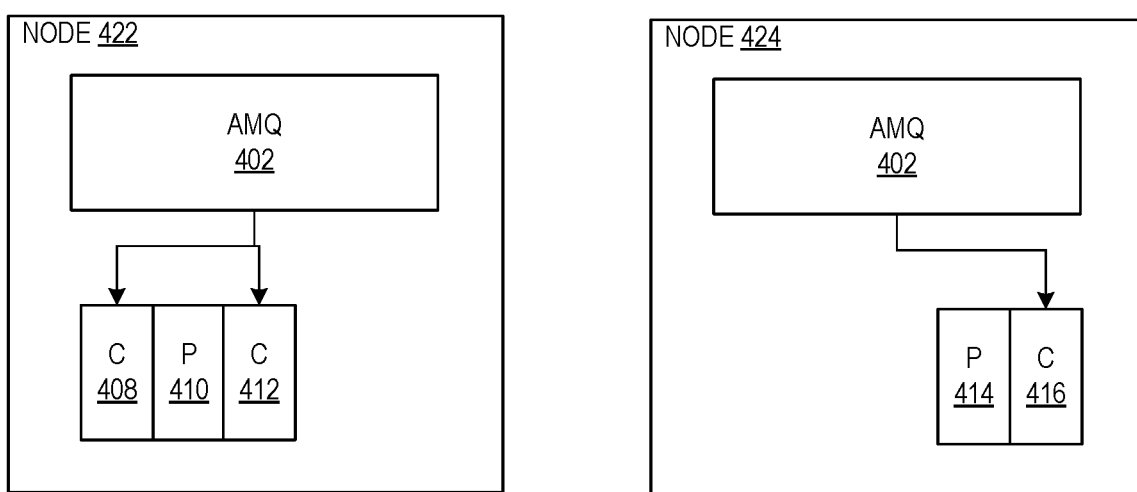

FIGS. 4A and 4B are diagrams illustrating a node in a $B^\epsilon$-tree before and after splitting the node when using an approach of copying an AMQ during a split. In one embodiment, the file system process maintains AMQ accuracy during a node split by copying the entire AMQ into each node resulting from the split. For example, when node 420 splits into nodes 422 and 424, the file system process copies AMQ 402 into nodes 422 and 424. This embodiment provides for simple management of AMQs when splitting nodes. In one embodiment, the split includes creating a single new node and a copy of the entire AMQ remains in the existing node in addition to being copied into the new node.

In an embodiment where the AMQ data structure does not provide false negatives and may provide false positives, however, this approach may increase the number of false positives. The increase in false positives is due to a portion of the buffer membership that the AMQ approximates being in the buffer of a different node following the split. For example, querying the AMQ 402 in node 422 for a buffered insertion message in the pivot range running after pivot value 414 may return a false positive, since the file system process would have put that insertion message into the buffer belonging to node 424. In embodiments using entire copies of the AMQ during splits, the file system process may use a counter and a rebuilding threshold value. When the file system process has copied the AMQ more times than the rebuilding threshold value, the file system process forces a rebuild of the AMQ consistent with the buffer whose membership is approximated by the AMQ. One exemplary rebuilding threshold value is 2. In this example, the initial size of AMQ can hold twice as many keys that a node's buffer can hold without significant increase of false positive rate. In one embodiment, rebuilding includes loading a node's buffer into working memory (e.g., from local storage 150 to RAM 127) and generating a new AMQ approximating the current membership of the buffer. In an embodiment in which the file system process is merging nodes, the file system process rebuilds the AMQ based on the contents of the merged buffer.

Figure 5:
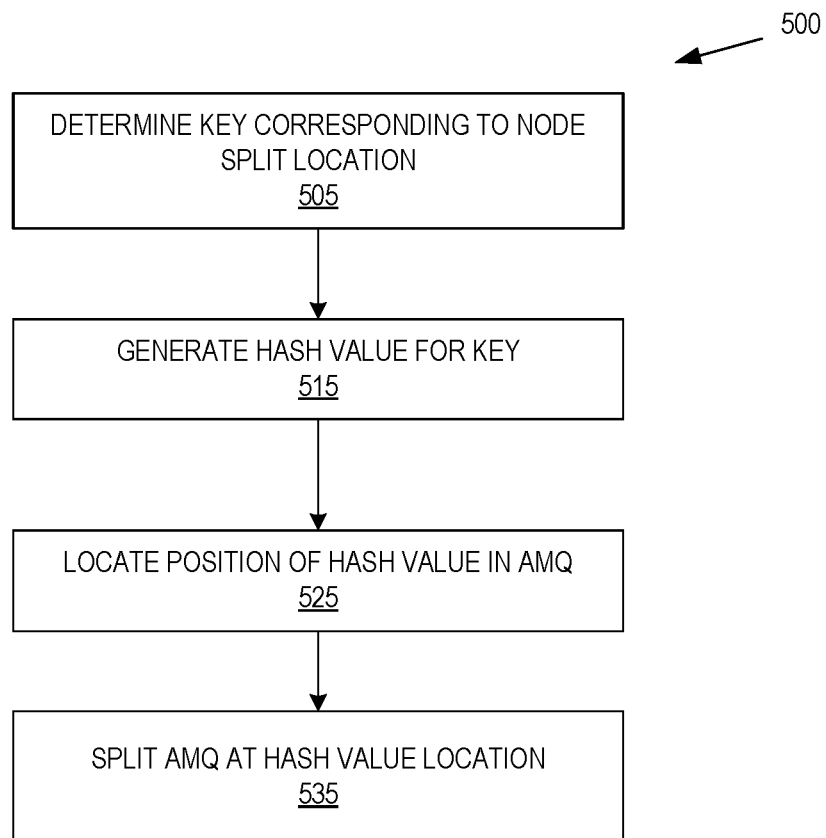
FIG. 5 is a flow chart illustrating an exemplary method of splitting an AMQ at a hash location.
Figure 6A:
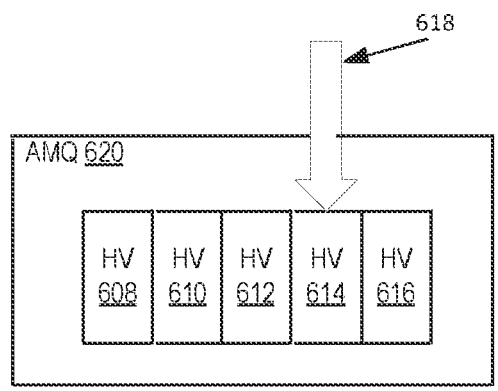
FIGS. 6A and 6B are diagrams illustrating an AMQ data structure before and after being split at a hash value.
Figure 6B:
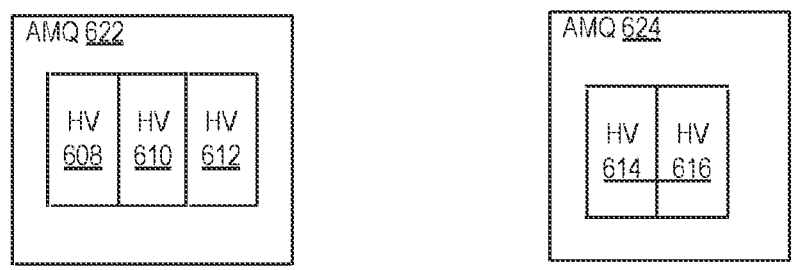

FIG. 5 is a flow chart illustrating an exemplary method of splitting an AMQ at a hash value. FIGS. 6A and 6B are diagrams illustrating an AMQ data structure before and after being split at a hash value.

At block 505, file system process 129 determines a key whose value corresponds to a location at which to split a node. For example, in response to determining that a node has more than a maximum number of child nodes, file system process 129 determines a location at which to split the node. In one embodiment, file system 129 determines the split location by selecting a pivot value balancing the number of child nodes in the split nodes. Other splitting techniques known in the art may be used.

At block 515, file system process 129 applies a hashing operation to the value of the key or another operation to determine the corresponding AMQ entry for the key. This hashing operation corresponds to the type of data structure the file system process uses for AMQs. In this embodiment, the data structure of the AMQ has a property in which the hash values in the AMQ are stored in an order corresponding to the initial plaintext or cleartext value. For example, a quotient filter is a known data structure having this property. This property allows the AMQ to be split at a hash value corresponding to key.

At block 525, file system process 129 locates the position of the hash value in AMQ 620 for the node to be split. For example, referring to FIG. 6A, the hashed value corresponds to hashed value 614 in AMQ 620.

At block 535, file system process 129 splits AMQ 620 into AMQ 622 and AMQ 624 at hashed value 614. The first newly split node would receive AMQ 620 and the corresponding set of buffered insertion messages, child pointers, and pivot values, while the second newly split node would receive AMQ 624 and its corresponding buffered insertion messages, child pointers, and pivot values from the file system process. Due to the ordered property of the AMQ data structure, AMQ 622 and AMQ 624 would maintain the no-false-positive invariant with requiring that the AMQ be rebuilt.

Figure 7:
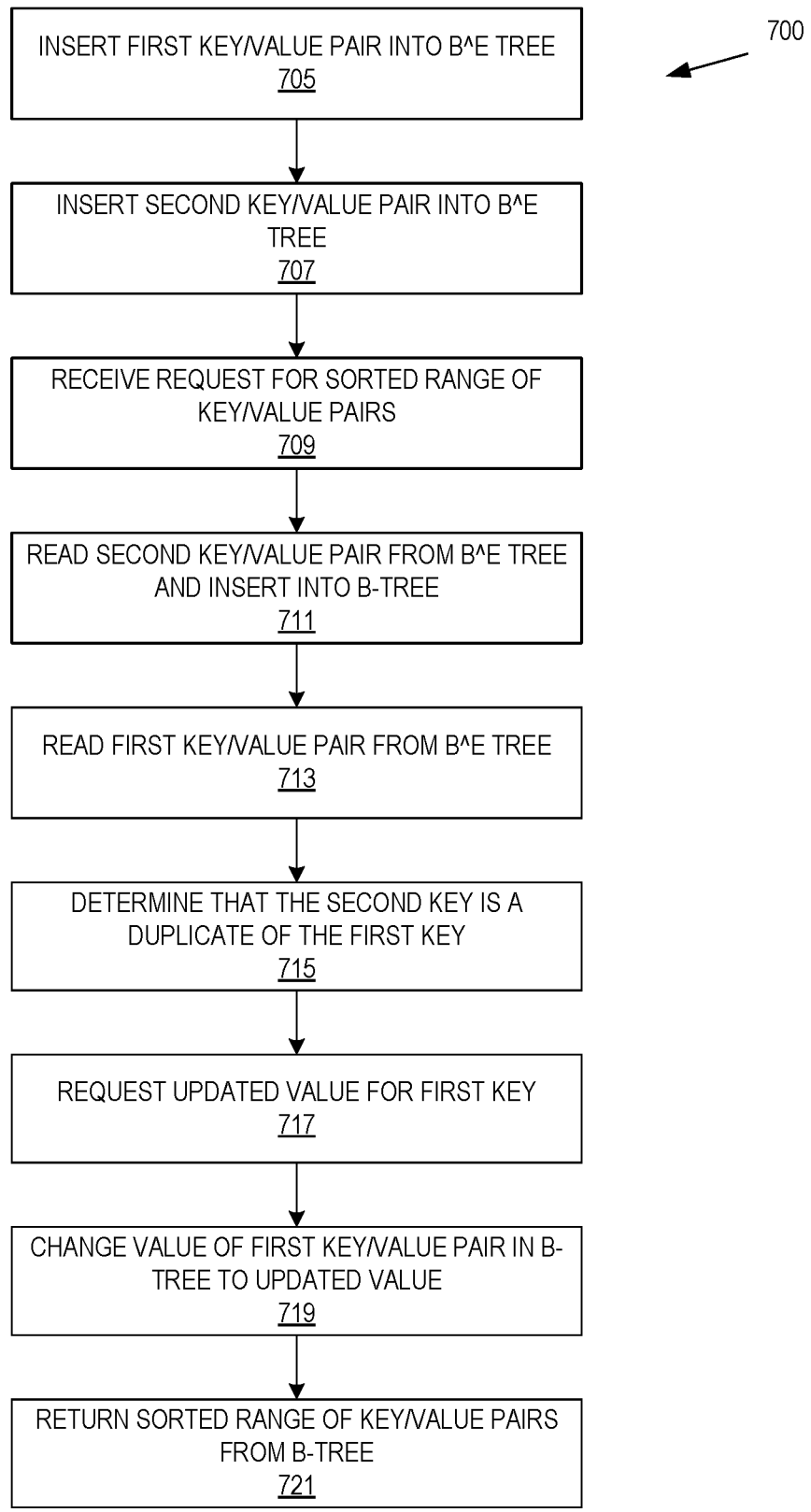
FIG. 7 is a flow chart illustrating an exemplary method of servicing a sorted range query.
Figure 8:
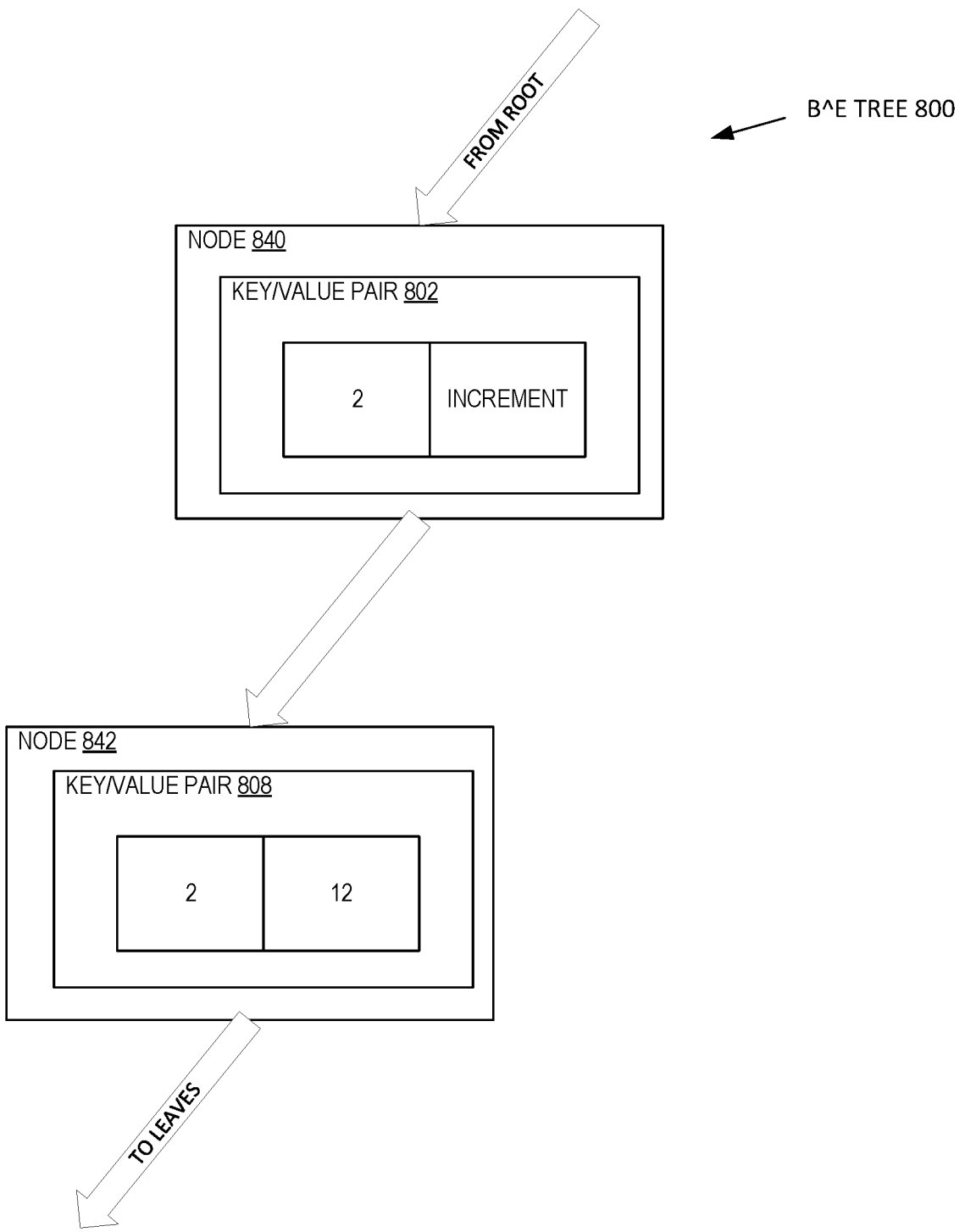
FIG. 8 is a diagram illustrating key/value pairs in a $B^\varepsilon$-tree.
Figure 9:
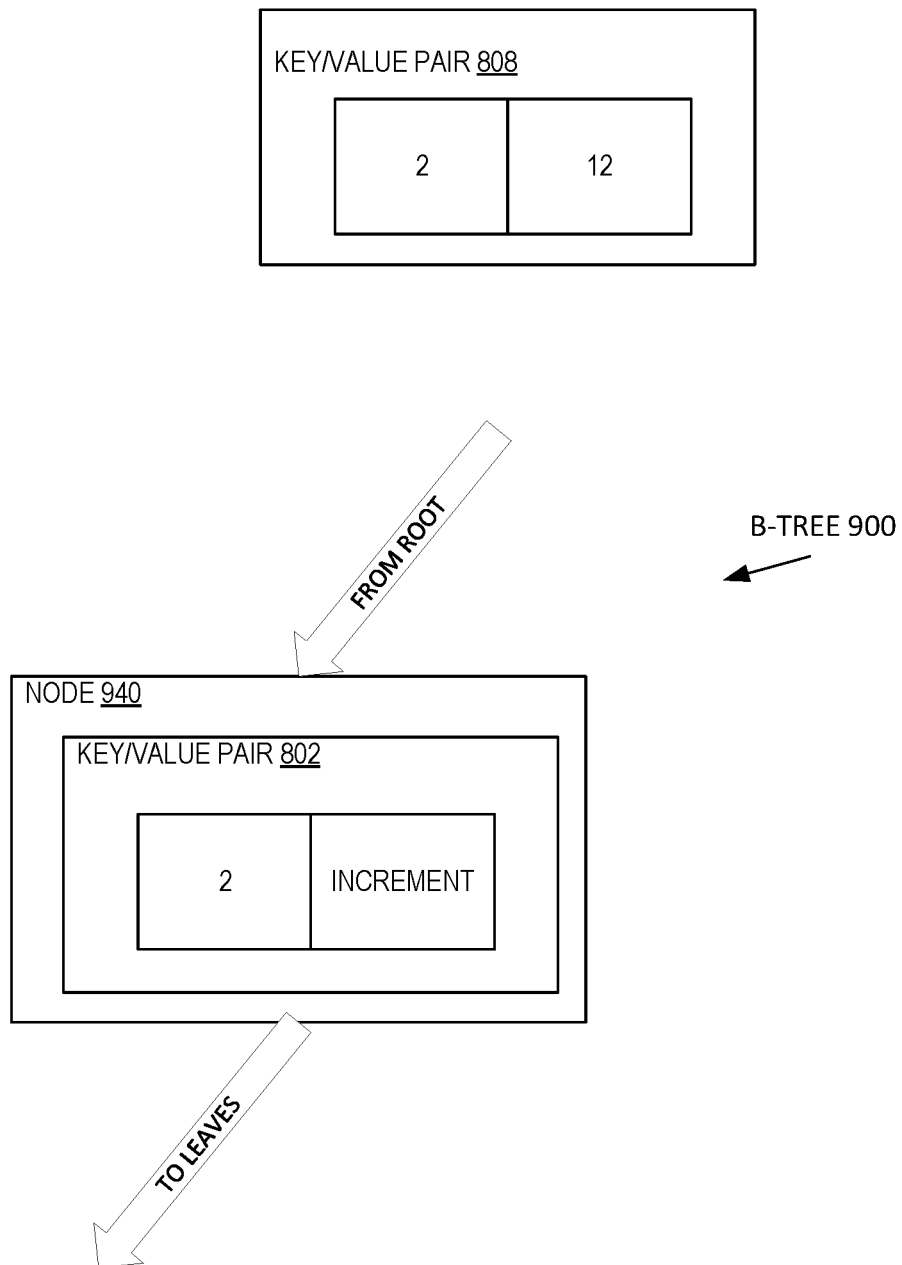
FIG. 9 is a diagram illustrating a key/value pair awaiting insertion into a B-tree.

FIG. 7 is a flow chart illustrating an exemplary method of servicing a sorted range query. FIG. 8 is a diagram illustrating key/value pairs in a $B^\epsilon$-tree. FIG. 9 is a diagram illustrating a key/value pair awaiting insertion into a B-tree.

In one embodiment, $B^\epsilon$-trees include a buffer at each non-leaf node storing messages for the subtree rooted at the non-leaf node. Messages may include actual values for insertion into leaf nodes or operations on existing value(s). The buffers enable the batching of pending updates to the leaf nodes of the tree. In this embodiment, keys may not be unique because the leaf node insertions and value updates for the new messages are not necessarily completed at the time of insertion of the message to the tree. For example, a $B^\epsilon$-tree may include a value for leaf insertion in a buffer of one non-leaf node and an update for that value in another non-leaf node.

At block 705, a file system process inserts a first key/value pair into a $B^\epsilon$-tree. The key is unique within the $B^\epsilon$-tree. For example, the first key/value pair is key/value pair 808, having a key of 2 and a value of 12.

At block 707, the file system process inserts a second key/value pair into the $B^\epsilon$-tree, such as key/value pair 802, having a key of 2 and a value of "increment." For example, the second key/value pair is key/value pair 802 shown in node 840. In some embodiments, the file system process inserts more than two key/value pairs into the $B^\epsilon$-tree. In $B^\epsilon$-tree 800, file system process 129 inserted key/value pair 808 before key/value pair 802, and an intervening flush caused key/value pair 802 to be moved (e.g., from node 840) to node 842, a child node of node 840.

At block 709, the file system process receives a request for a sorted range of key/value pairs. The request may include a key and a quantity of key/value pairs to return that are following that key in sorted order. For example, the request may request one thousand (1,000) key/value pairs that follow the key 1. Such large range requests may be used when: backing up a large range of the $B^\epsilon$-tree to a remote site, batch loading a large range of the $B^\epsilon$-tree to memory for checking the data structure consistency against other data structures, and handling large read request with deep pipelines.

At block 711, the file system process reads the second key/value pair from the $B^\epsilon$-tree and inserts the second key/value pair into a B-tree. B-trees sort key/value pairs as the pairs are inserted into the B-tree. In one embodiment, because the second key/value pair was inserted into the $B^\epsilon$-tree after the first key/value pair, the second key/value pair is higher in the $B^\epsilon$-tree than the first key/value pair and is read from the $B^\epsilon$-tree before the first key/value pair. In the example illustrated by $B^\epsilon$-tree, the file system process will read key/value pair 802 containing a message to increment the value corresponding to key 2 before reading key/value pair 808, which contains the actual value corresponding to key 2.

At block 713, the file system process reads the first key/value pair from the $B^\epsilon$-tree. At block 715, the file system process determines that the second key is a duplicate of the first key. For example, in attempting to insert the second key/value pair into the B-tree, the file system process determines that the keys of the first and second key/value pairs match. In this embodiment, the B-tree requires keys to be unique. For example, in FIG. 9 key/value pair 802 with a key of 2 is already in the B-tree, while key/value pair 808 awaits insertion and also has a key of 2.

At block 717, the file system process determines an updated value for the first key. In one embodiment, the file system process makes the determination by invoking a callback function with the first key, the first value, and the second value. A callback request may include the two values found in the first and second key/value pairs along with the key 2. The callback function interprets these values and provides an updated value or key/value pair in response. For example, the first value may be an integer and the second value may be an increment operation.

At block 719, the file system process changes the value of the first key/value pair in the B-tree to reflect the updated value from block 717. For example, the updated value of key/value pair 802 within node 940 is 13. At block 721, the file system process returns a sorted range of key/value pairs from the B-tree. In this embodiment, the B-tree sorts key/value pairs as the file system process inserts them into the B-tree. This allows the file system process 129 to quickly generate the sorted and updated key/value pairs requested at block 709 while handling unresolved changes to values within the $B^\epsilon$-tree using the callback mechanism.

Figure 10:
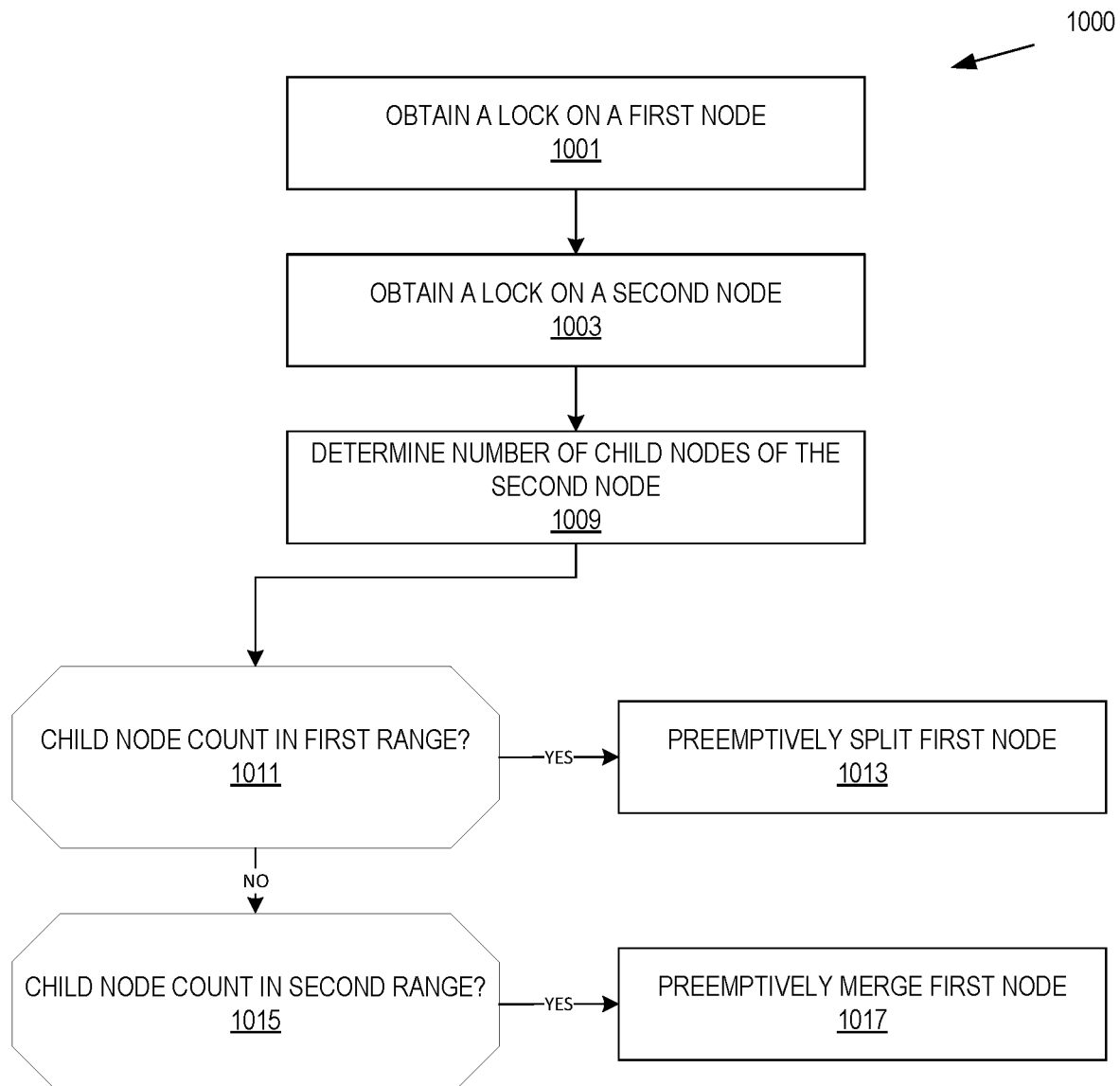
FIG. 10 is a flow chart illustrating an exemplary method of proactively splitting or merging a $B^\varepsilon$-tree node.

FIG. 10 is a flow chart illustrating an exemplary method of proactively splitting or merging a $B^\epsilon$-tree node.

At block 1001, a file system process (e.g., file system process 129) obtains a lock on a first node. In one embodiment, the first node is a node in a $B^E$-tree that includes a plurality of child nodes.

At block 1003, the file system process obtains a lock on a second node. The second node is a child node of the first node. The second node includes a buffer of messages awaiting insertion in the subtree rooted at the second node. In one embodiment, the file system process determines that a buffer included in the second node requires flushing. As described in this document, the buffer may use a B-tree structure. The file system may determine that the buffer requires flushing because the buffer has exceeded a size threshold. For example, the file system process flushes the buffer when it reaches half of its capacity, which is a predetermined parameter when formatting the $B^{\epsilon\epsilon}$-tree. The file system process flushes messages from the buffer of the second node to a buffer of a child node of the second node. In another embodiment, the file system process flushes messages from the buffer of the second node to more than one child node buffer. The file system process may determine child node buffers according to which child is to receive the messages being flushed. For example, if the second node has 100 messages in its buffer for the first child of the second node (or subtree rooted at the first child) and 50 messages in its buffer for the second child of the second node (or subtree rooted at the second child), the file system process would flush the 100 messages to the first child, determine if the buffer of the second node still requires flushing to bring the number of messages in the buffer below the threshold, and if flushing is still required, flush the 50 messages to the second child of the second node.

At block 1009, the file system process counts the number of child nodes belonging to the second node. In this embodiment, the file system process determines whether to proactively split or proactively merge the second node based on how many child nodes the second node has. The number of child nodes of a node may be called "fan out." Each non-leaf node has a maximum number of child nodes or "maximum fan out."

At block 1011, the file system process determines whether the number of child nodes of the second node is within a first range. In one embodiment, the first range is defined to be between the maximum fan out and one half of the maximum fan out. If the number of child nodes is within the first range, the file system process proactively splits the second node at block 1013. Splitting of non-leaf nodes in $B^\epsilon$-trees is described in related application "Write-optimized Nested Trees" referenced above.

If at block 1011 the file system process determines that the number of child nodes assigned to the second node is not within the first range, the file system process determines at block 1015 whether the number of child nodes of the second node is within a second range. In one embodiment, the second range is defined to be between one quarter of the maximum fan out and one eighth of the maximum fan out. If the number of child nodes is within the second range, the file system process proactively merges the second node at block 1017. Merging of non-leaf nodes in $B^\epsilon$-trees is also described in related application "Write-optimized Nested Trees" referenced above. If at block 1015 the file system process determines that the number of child nodes assigned to the second node is not within the second range, the file system process does not take proactively action on the second node.

By maintaining locks on the first and second nodes, the file system process is able to proactively merge or split the second node and update pivot values within the first node to reflect the merge or split. As a result, the file system process maintains locks on only the nodes impacted by the current merge or split while allowing concurrent access of other portions of the tree.

Figure 11:
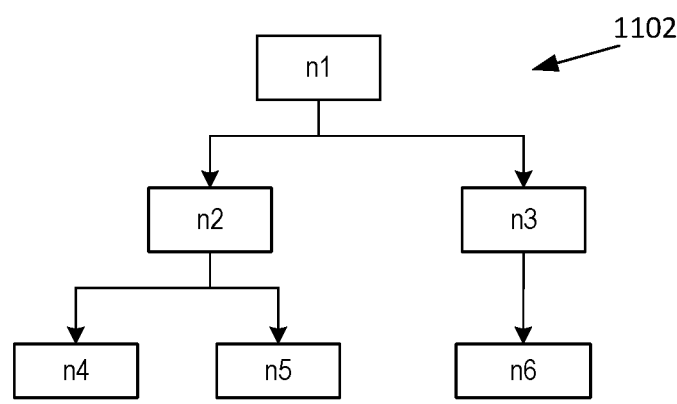
FIG. 11 is a diagram illustrating a B-tree buffer stored in different memory regions of a solid state device ("SSD")
Figure 11:
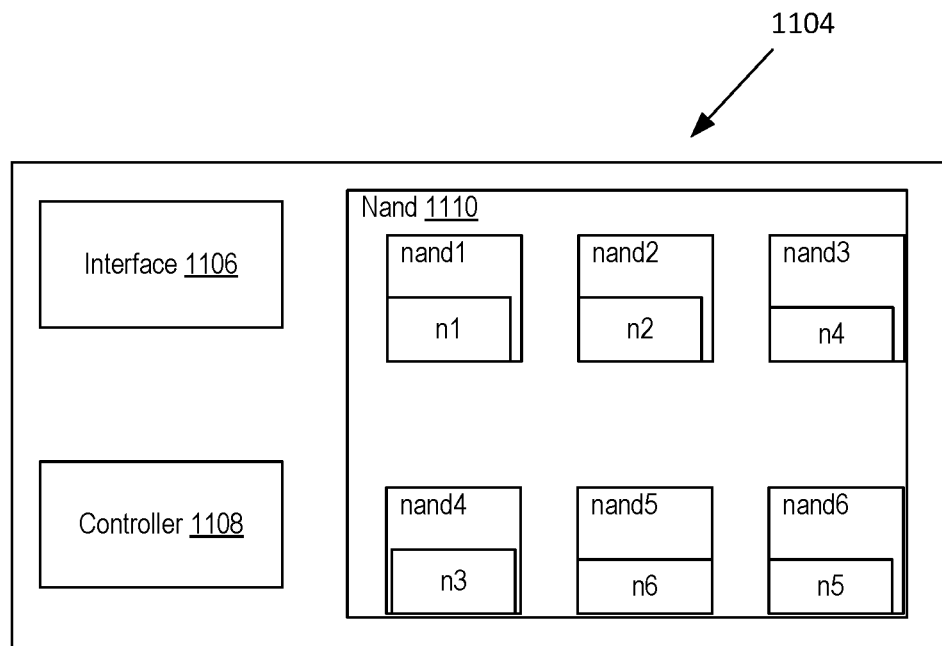

FIG. 11 is a diagram illustrating a B-tree buffer stored in different memory regions of a solid state device ("SSD"). An example of a buffer is B-tree 1102 made up of nodes n1-n6. In one embodiment, a $B^\epsilon$-tree implements node buffers using B-trees and stores the node buffers on a solid state storage device ("SSD"). An example of a SSD is SSD 1104, made up of a host interface 1106, controller 1108, and NAND packages 1110. In this example, the SSD non-contiguously stores the nodes of B-tree 1102 in NAND packages 1110. For example, node 1 of B-tree 1102 is in NAND package 1, while node 6 is in NAND package 5.

Figure 12:
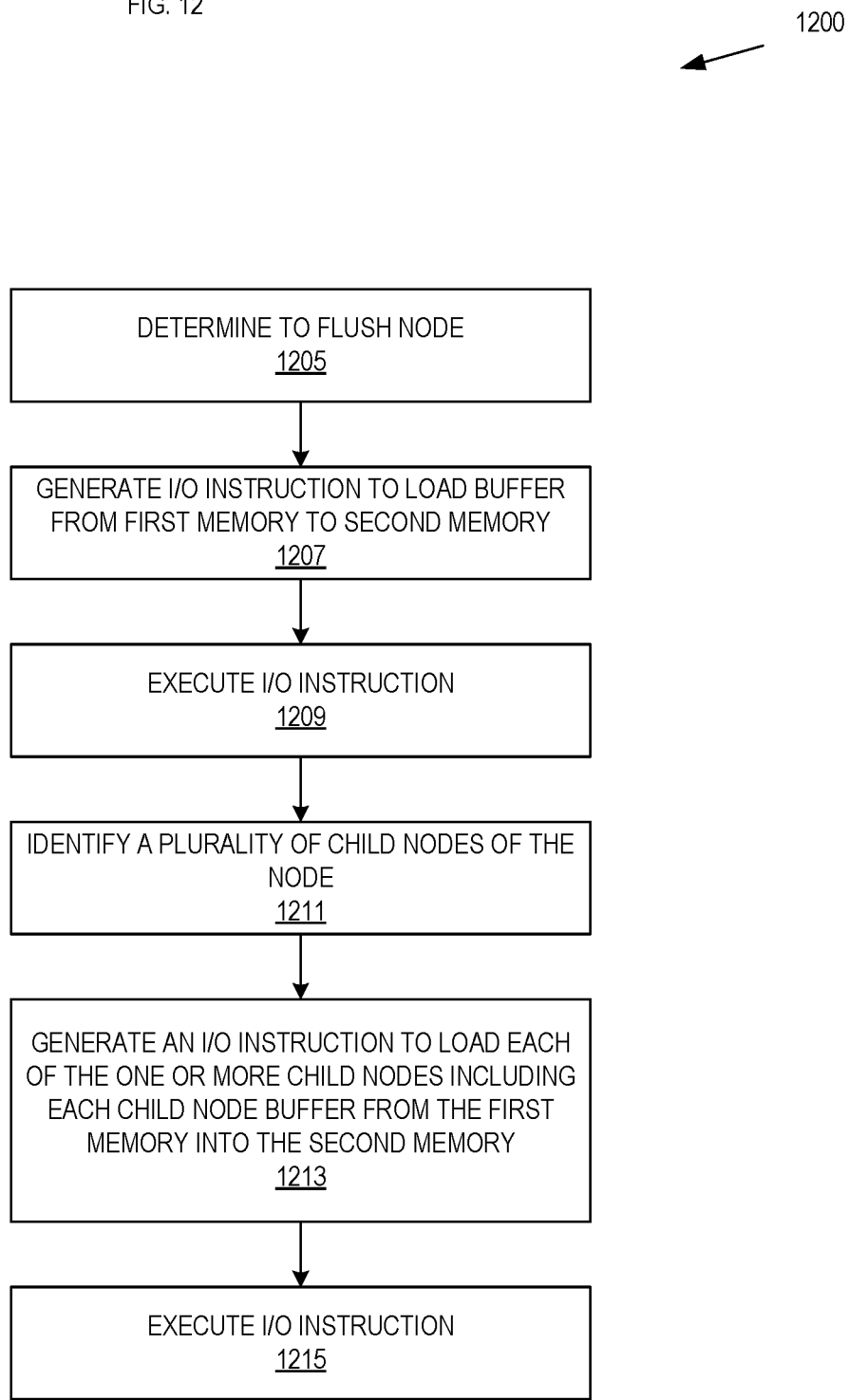
FIG. 12 is a flow chart illustrating an exemplary method of servicing a flush on a node by reading a B-tree buffer.

FIG. 12 is a flow chart illustrating an exemplary method of servicing a flush on a node by reading a B-tree buffer. At block 1205, a file system process determines to flush a node. In one embodiment, the node is a non-leaf node in a $B^\varepsilon$-tree and the file system process determines to flush the buffer when the buffer reaches a threshold size. For example, when the buffer is half full. The $B^\varepsilon$-tree uses buffers at each non-leaf node to store pending messages to the subtree rooted at the non-leaf node.

At block 1207, the file system process generates an input/output ("I/O") instruction to load the buffer of the node that the file system process is flushing from a first memory to a second memory. In this example, the $B^\varepsilon$-tree has a buffer at each non-leaf node, and each buffer is structured as a B-tree with multiple nodes stored across multiple NAND packages 1110. In one embodiment, the first memory is SSD 1104 and the second memory is volatile memory, such as RAM 127. The file system process generates the I/O instruction to read every node of the node's B-tree buffer concurrently up to the read bandwidth limit of SSD 1104, without regard to whether the SSD 1104 stores the individual nodes contiguously or non-contiguously within NAND packages 1110.

At block 1209, the file system process sends the I/O operation to the SSD for execution. In one embodiment, the file system process loads the entire B-tree buffer when the file system process performs a flush on the node but during a query operation on the node, only reads in one or more nodes of the B-tree that the file system process needs for the query operation. Loading the entire buffer in a single I/O operation decreases the delay associated with loading the buffer. At block 1211, the file system process may identify a plurality of child nodes of the nodes. In one embodiment, the file system process simultaneously loads multiple nodes including their buffers concurrently. For example, when flushing messages from a parent buffer to more than one child node buffer, the file system process may load one or more of the child nodes and the child node buffers into memory. In example, at block 1213 the file system process generates an I/O operation to load each of the one or more child nodes of the node including the child node buffers from the first memory to the second memory. At block 1215 the file system process executes the I/O instruction, including concurrent execution of read operations for non-contiguously stored child nodes, child node buffers, and other metadata that may be associated with the child nodes.

It will be apparent from this description that aspects of the inventions may be embodied, at least in part, in software. That is, the computer-implemented method 200 may each be carried out in a computer system or other data processing system, such as nodes 105-107, in response to its processor executing sequences of instructions contained in a memory or other non-transitory machine-readable storage medium. The software may further be transmitted or received over a network (not shown) via a network interface. In various embodiments, hardwired circuitry may be used in combination with the software instructions to implement the present embodiments. It will also be appreciated that additional components, not shown, may also be part of nodes 105-107, and, in certain embodiments, fewer components than that shown in FIG. 1 may also be used in nodes 105-107.

An article of manufacture, such as a non-transitory computer readable medium, may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), NVMe drives, Non-Volatile RAM devices including but not limited to phase change memory, optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, containers running in VMs, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document, or portions thereof, may be repeated or performed in parallel with one another or in parallel with different instances of the same or similar methods.

What is claimed is:

1. A computer-implemented method, comprising:
    reading a first node in a tree data structure from a first memory, the first node including a first approximate membership query data structure ("AMQ"), a first plurality of child pointers, a first plurality of pivot values, and a first buffer storing pending insertion messages for a subtree rooted at the first node, wherein the first AMQ includes approximate membership of the first buffer;
    maintaining an invariant that the AMQ will not return false negatives when queried for a key value, including determining that a quantity of child pointers in the first plurality of child pointers exceeds a maximum number of child pointers, and in response to the determining:
        splitting, using a pivot value in the first plurality of pivot values the first node into a second node and a third node, wherein a first portion of the first plurality of child pointers are included in the second node and a second portion of the first plurality of child pointers are included in the third node;
        splitting, using the pivot value, the first buffer into a second buffer and a third buffer, wherein the second node includes the second buffer and the third node includes the third buffer; and
        splitting the first AMQ between the second node as a second AMQ and the third node as a third AMQ, wherein the second AMQ is associated with key values added to the second node having a first pivot range from a first child key value to the pivot value and the third AMQ is associated with key values added to the third node having a second pivot range from after the pivot value to a last child key value, and wherein the each of the second AMQ and the third AMQ approximates a portion of the first buffer membership corresponding, respectively, to the first pivot range and the second pivot range.

2. The computer-implemented method of claim 1, wherein the first AMQ includes separate data structures for the second AMQ and the third AMQ.

3. The computer-implemented method of claim 2, wherein generating the second AMQ and the third AMQ comprises including the second AMQ in the second node and including the third AMQ in the third node.

4. The computer-implemented method of claim 3, further comprising:
    merging the second node and the third node into a fourth node, wherein a merged AMQ included in the fourth node includes the second AMQ and the third AMQ.

5. The computer-implemented method of claim 1, further comprising:
    generating a hashed value of a particular key in the second node;
    determining a location for the hashed value in the second AMQ;
    splitting the second AMQ into a fourth AMQ and a fifth AMQ at the location of the hashed value in the second AMQ.

6. The computer-implemented method of claim 5, wherein the first AMQ uses a quotient filter data structure.

7. A non-transitory computer-readable medium storing instructions, which when executed by a processing device, cause the processing device to perform a method comprising:
    reading a first node in a tree data structure from a first memory, the first node including a first approximate membership query data structure ("AMQ"), a first plurality of child pointers, a first plurality of pivot values, and a first buffer storing pending insertion messages for a subtree rooted at the first node, wherein the first AMQ includes approximate membership of the first buffer;
    maintaining an invariant that the AMQ will not return false negatives when queried for a key value, including determining that a quantity of child pointers in the first plurality of child pointers exceeds a maximum number of child pointers, and in response to the determining:
        splitting, using a pivot value in the first plurality of pivot values, the first node into a second node and a third node, wherein a first portion of the first plurality of child pointers are included in the second node and a second portion of the first plurality of child pointers are included in the third node;
        splitting, using the pivot value, the first buffer into a second buffer and a third buffer, wherein the second node includes the second buffer and the third node includes the third buffer; and
        splitting the first AMQ between the second node as a second AMQ and the third node as a third AMQ, wherein the second AMQ is associated with key values added to the second node having a first pivot range from a first child key value to the pivot value and the third AMQ is associated with key values added to the third node having a second pivot range from after the pivot value to a last child key value, and wherein the each of the second AMQ and the third AMQ approximates a portion of the first buffer membership corresponding, respectively, to the first pivot range and the second pivot range.

8. The non-transitory computer-readable medium of claim 7, wherein the first AMQ includes separate data structures for the second AMQ and the third AMQ.

9. The non-transitory computer-readable medium of claim 8, wherein generating the second AMQ and the third AMQ comprises including the second AMQ in the second node and including the third AMQ in the third node.

10. The non-transitory computer-readable medium of claim 9, the method further comprising:

merging the second node and the third node into a fourth node, wherein a merged AMQ included in the fourth node includes the second AMQ and the third AMQ.

11. The non-transitory computer-readable medium of claim 7, wherein the method performed by the processing device further comprises:
generating a hashed value of a particular key in the second node;
determining a location for the hashed value in the second AMQ;
splitting the second AMQ into a fourth AMQ and a fifth AMQ at the location of the hashed value in the second AMQ.

12. The non-transitory computer-readable medium of claim 11, wherein the first AMQ uses a quotient filter data structure.

13. An apparatus comprising:
a processing device; and
a memory coupled to the processing device, the memory storing instructions which, when executed by the processing device, cause the apparatus to:
read a first node in a tree data structure from a first memory, the first node including a first approximate membership query data structure ("AMQ"), a first plurality of child pointers, a first plurality of pivot values, and a first buffer storing pending insertion messages for a subtree rooted at the first node, wherein the first AMQ includes approximate membership of the first buffer;
maintain an invariant that the AMQ will not return false negatives when queried for a key value, including determining that a quantity of child pointers in the first plurality of child pointers exceeds a maximum number of child pointers, and in response to the determining:
split, using a pivot value in the first plurality of pivot values, the first node into a second node and a third node, wherein a first portion of the first plurality of child pointers are included in the second node and a second portion of the first plurality of child pointers are included in the third node;
split, using the pivot value, the first buffer into a second buffer and a third buffer, wherein the second node includes the second buffer and the third node includes the third buffer; and
splitting the first AMQ between the second node as a second AMQ and the third node as a third AMQ, wherein the second AMQ is associated with key values added to the second node having a first pivot range from a first child key value to the pivot value and the third AMQ is associated with key values added to the third node having a second pivot range from after the pivot value to a last child key value, and wherein the each of the second AMQ and the third AMQ approximates a portion of the first buffer membership corresponding, respectively, to the first pivot range and the second pivot range.

14. The apparatus of claim 13, wherein the first AMQ includes separate data structures for the second AMQ and the third AMQ.

15. The apparatus of claim 14, wherein generating the second AMQ and the third AMQ comprises including the second AMQ in the second node and including the third AMQ in the third node.

16. The apparatus of claim 15, the instructions further causing the apparatus to:
merge the second node and the third node into a fourth node, wherein a merged AMQ included in the fourth node includes the second AMQ and the third AMQ.

17. The apparatus of claim 13, the instructions further causing the apparatus to: generate a hashed value of a particular key in the second node;
determine a location for the hashed value in the second AMQ;
split the second AMQ into a fourth AMQ and a fifth AMQ at the location of the hashed value in the second AMQ.

18. The method of claim 1, further comprising:
determining that and AMQ approximating the first buffer membership has been copied a threshold number of times; and
in response to the determining, rebuilding the AMQ for one or more nodes to be consistent with the current membership of the buffer of the corresponding node of the one or more nodes.

19. The non-transitory computer-readable medium of claim 7, wherein the method performed by the processing device further comprises:
determining that and AMQ approximating the first buffer membership has been copied a threshold number of times; and
in response to the determining, rebuilding the AMQ for one or more nodes to be consistent with the current membership of the buffer of the corresponding node of the one or more nodes.

20. The apparatus of claim 13, the instructions further causing the apparatus to:
determine that and AMQ approximating the first buffer membership has been copied a threshold number of times; and
in response to the determining, rebuild the AMQ for one or more nodes to be consistent with the current membership of the buffer of the corresponding node of the one or more nodes.

* * * * *